US007620546B2

(12) United States Patent
Hetherington et al.

(10) Patent No.: US 7,620,546 B2
(45) Date of Patent: Nov. 17, 2009

(54) ISOLATING SPEECH SIGNALS UTILIZING NEURAL NETWORKS

(75) Inventors: Phillip Hetherington, Port Moody (CA); Pierre Zakarauskas, Vancouver (CA); Shahla Parveen, Prince (CA)

(73) Assignee: QNX Software Systems (Wavemakers), Inc., Vancouver, British Columbia ( * ) Notice: Subject to any disclaimer, the term of this patent is extended or adjusted under 35 U.S.C. 154(b) by 795 days.

(21) Appl. No.: 11/085,825

(22) Filed: Mar. 21, 2005

(65) Prior Publication Data

US 2006/0031066 A1 Feb. 9, 2006

Related U.S. Application Data

(60) Provisional application No. 60/555,582, filed on Mar. 23, 2004.

(51) Int. Cl.
*G10L 15/16* (2006.01)

(52) U.S. Cl. ........................................ 704/232

(58) Field of Classification Search ................. 704/232, 704/233
See application file for complete search history.

(56) References Cited

U.S. PATENT DOCUMENTS

| | | | | |
|---|---|---|---|---|
| 5,335,312 | A | 8/1994 | Mekata et al. | |
| 5,809,462 | A * | 9/1998 | Nussbaum | 704/232 |
| 5,960,391 | A * | 9/1999 | Tateishi et al. | 704/232 |
| 6,175,818 | B1 * | 1/2001 | King | 704/232 |
| 6,347,297 | B1 * | 2/2002 | Asghar et al. | 704/243 |
| 7,203,643 | B2 * | 4/2007 | Garudadri | 704/233 |
| 7,212,965 | B2 * | 5/2007 | Dupont | 704/220 |

FOREIGN PATENT DOCUMENTS

WO WO 01/13364 A1 * 2/2001

* cited by examiner

*Primary Examiner*—Michael N Opsasnick
(74) *Attorney, Agent, or Firm*—Brinks Hofer Gilson & Lione

(57) ABSTRACT

A speech signal isolation system configured to isolate and reconstruct a speech signal transmitted in an environment in which frequency components of the speech signal are masked by background noise. The speech signal isolation system obtains a noisy speech signal from an audio source. The noisy speech signal may then be fed through a neural network that has been trained to isolate and reconstruct a clean speech signal from against background noise. Once the noisy speech signal has been fed through the neural network, the speech signal isolation system generates an estimated speech signal with substantially reduced noise.

21 Claims, 14 Drawing Sheets

ISOLATING SPEECH SIGNALS UTILIZING NEURAL NETWORKS

RELATED APPLICATION

This application claims the benefit of U.S. Provisional Patent Application Ser. No. 60/555,582 filed Mar. 23, 2004.

BACKGROUND OF THE INVENTION

1. Technical Field

This invention relates generally to the field of speech processing systems, and more specifically, to the detection and isolation of a speech signal in a noisy sound environment.

2. Related Art

A sound is a vibration transmitted through any elastic material, solid, liquid, or gas. One type of common sound is human speech. When transmitting speech signals in a noisy environment, the signal is often masked by background noise. A sound may be characterized by frequency. Frequency is defined as the number of complete cycles of a periodic process occurring over a unit of time. A signal may be plotted against an x-axis representing time and a y-axis representing amplitude. A typical signal may rise from its origin to a positive peak and then fall to a negative peak. The signal may then return to its initial amplitude, thereby completing a first period. The period of a sinusoidal signal is the interval over which the signal is repeated.

Frequency is generally measured in Hertz (Hz). A typical human ear can detect sounds in the frequency range of 20-20,000 Hz. A sound may consist of many frequencies. The amplitude of a multifrequency sound is the sum of the amplitudes of the constituent frequencies at each time sample. Two or more frequencies may be related to one another by virtue of a harmonic relationship. A first frequency is a harmonic of a second frequency if the first frequency is a whole number multiple of the second frequency.

Multi-frequency sounds are characterized according to the frequency patterns which comprise them. Generally, noise will fall off a frequency plot at a certain angle. This frequency pattern is named "pink noise." Pink noise is comprised of high intensity low frequency signals. As the frequency increases, the intensity of the sound diminishes. "Brown noise" is similar to "pink noise," but exhibits a faster fall off. Brown noise may be found in automobile sounds, e.g., a low frequency rumbling, which tends to come from body panels. Sound that exhibits equal energy at all frequencies is called "white noise."

A sound may also be characterized by its intensity, which is typically measured in decibels (dB). A decibel is a logarithmic unit of sound intensity, or ten times the logarithm of the ratio of the sound intensity to some reference intensity. For human hearing, the decibel scale is defined from zero (dB) for the average least perceptible sound to about one-hundred-and-thirty 130 (dB) for the average pain level.

The human voice is generated in the glottis. The glottis is the opening between the vocal cords at the upper part of the larynx. The sound of the human voice is created by the expiration of air through the vibrating vocal cords. The frequency of the vibration of the glottis characterizes these sounds. Most voices fall in the range of 70-400 Hz. A typical man speaks in a frequency range of about 80-150 Hz. Women generally speak in the range of 125-400 Hz.

Human speech consists of consonants and vowels. Consonants, such as "TH" and "F" are characterized by white noise. The frequency spectrum of these sounds is similar to that of a table fan. The consonant "S" is characterized by broad-band noise, usually beginning at around 3000 Hz and extending up to about 10,000 Hz. The consonants, "T", "B", and "P", are called "plosives" and are also characterized by broad-band noise, but which differ from "S" by the abrupt rise in time. Vowels also produce a unique frequency spectrum. The spectrum of a vowel is characterized by formant frequencies. A formant may be comprised of any of several resonance bands that are unique to the vowel sound.

A major problem in speech detection and recording is the isolation of speech signals from the background noise. The background noise can interfere with and degrade the speech signal. In a noisy environment, many of the frequency components of the speech signal may be partially, or even entirely, masked by the frequencies of the background noise. As such, a need exists for a speech signal isolation system that can isolate and reconstruct a speech signal in the presence of background noise.

SUMMARY

This invention discloses a speech signal isolation system that is capable of isolating and reconstructing a speech signal transmitted in an environment in which frequency components of the speech signal are masked by background noise. In one example of the invention, a noisy speech signal is analyzed by a neural network, which is operable to create a clean speech signal from a noisy speech signal. The neural network is trained to isolate a speech signal from against background noise.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

The present invention relates to a system and method for isolating a signal from background noise. The system and method are especially well adapted for recovering speech signals from audio signals generated in noisy environments. However, the invention is in no way limited to voice signals and may be applied to any signal obscured by noise.

Figure 1:
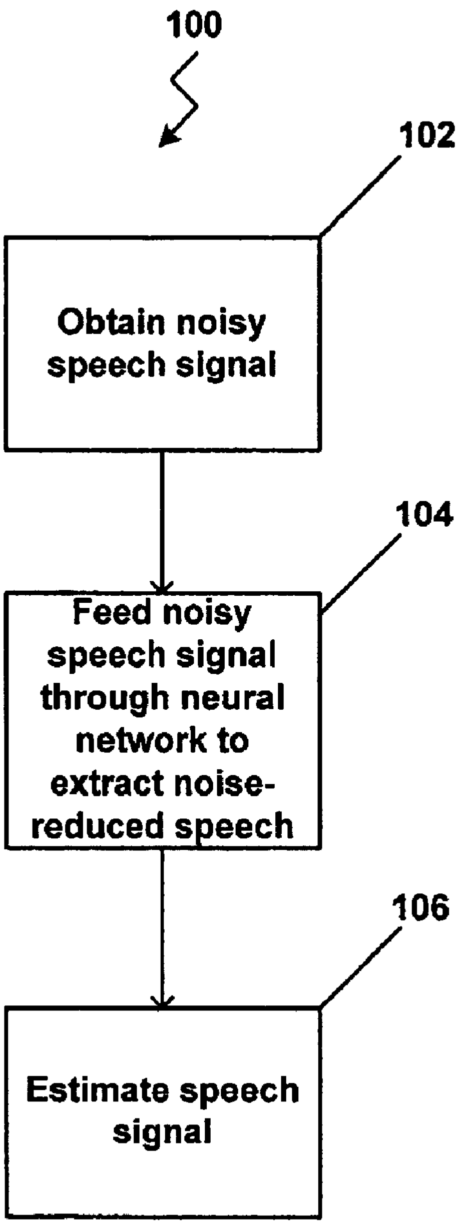
FIG. 1 is block diagram illustrating a speech signal isolation system.

In FIG. 1, a method 100 for isolating a speech signal from background noise is illustrated. The method 100 is capable of reconstructing and isolating a speech signal transmitted in an environment in which frequency components of the speech signal are masked by background noise. In the following description, numerous specific details are set forth to provide a more thorough description of the speech signal isolation method 100 and a corresponding system 10 for implementing the method. It should be apparent, however, to one skilled in the art, that the invention may be practiced without these specific details. In other instances, well known features have not been described in great detail so as not to obscure the invention. The method 10 for isolating a speech signal from background noise includes the step 102 of obtaining or receiving a noisy speech signal. A second step 104 is to feed the speech signal through a neural network adapted to extract noise reduced speech from the noise input signal. A final step 106 is to estimate the speech.

Figure 14:
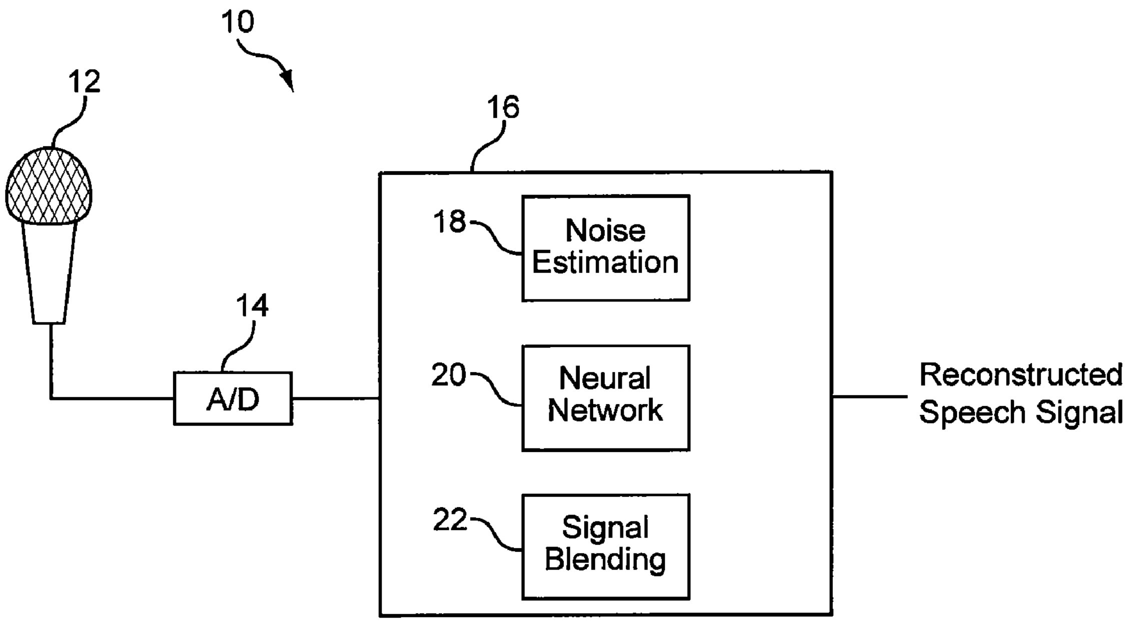
FIG. 14 is a block diagram of a speech signal isolation system.

A speech signal isolation system 10 is shown in FIG. 14. The speech signal isolation system may include an audio signal apparatus such as a microphone 12 our any other audio source configured to supply an audio signal. An A/D converter 14 may be provided to convert an analog speech signal from the microphone 12 into a digital speech signal and supply the digital speech signal as an input to a signal processing unit 16. The A/D converter may be omitted if the audio signal apparatus provides a digital audio signal. The digital processing unit 16 may be a digital signal processor, a computer, or any other type of circuit or system that is capable of processing audio signals. The signal processing unit includes a neural network component 18, a background noise estimation component 20, and a signal blending component 22. The noise estimation component estimates the noise level in the received signal across a plurality of frequency subbands. The neural network component 18 is configured to receive the audio signal and isolate a speech component of the audio signal from a background noise component of the audio signal. The signal blending component 22 reconstructs a complete noise-reduced speech signal as a function of the isolated speech component and the audio signal. Thus, the speech signal isolation system 10 is capable of isolating a speech signal from against background noise, significantly reducing or eliminating the background noise, and then reconstructing a complete speech signal by providing estimates of what the true speech signal would look and sound like if the background noise was not present in the original signal.

Figure 2:
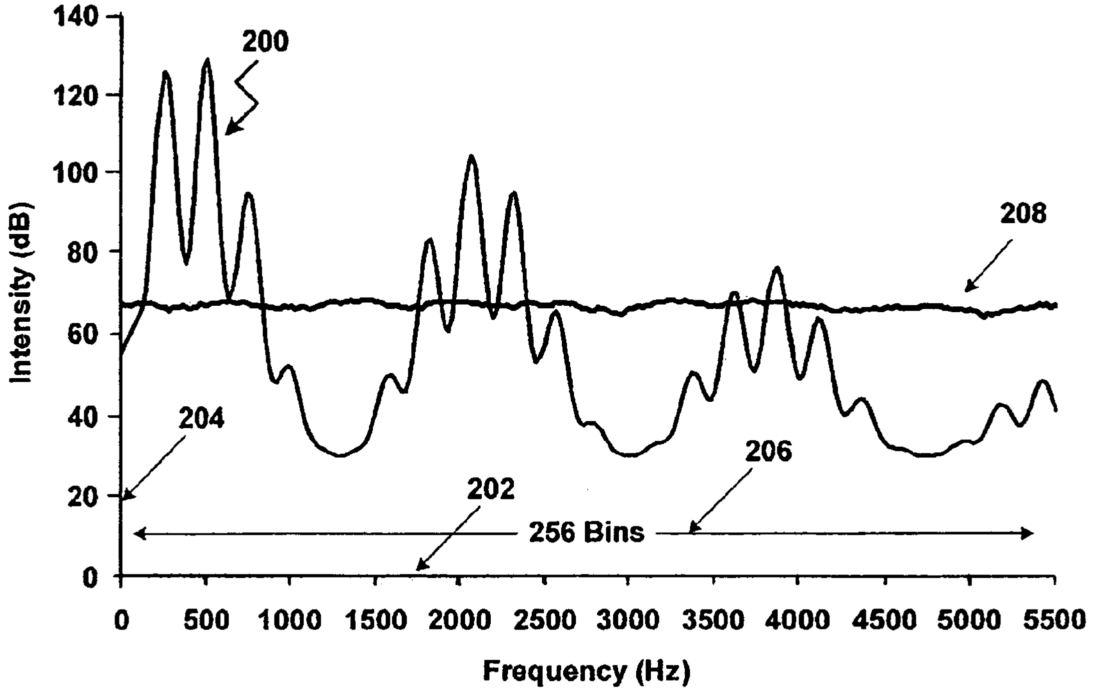
FIG. 2 is a diagram illustrating the frequency spectrum of a typical vowel sound.

FIG. 2 is a diagram illustrating the frequency spectrum of a typical vowel sound and is shown as an example of how a speech signal may be characterized. Vowel sounds are of particular interest because they are generally the highest intensity component of a speech signal, and as such have the highest likelihood of rising above the noise that interferes with the speech signal. Although a vowel sound is illustrated in FIG. 2, the speech signal isolation system 10 and method 100 may process any type of speech signal received as an input.

Vowel or speech signal 200 is characterized both by its constituent frequencies and the intensity of each frequency bands. Speech signal 200 is plotted against frequency (Hz) axis 202 and intensity (dB) axis 204. The frequency plot is generally comprised of an arbitrary number of discrete bins or bands. Frequency bank 206 indicates that 256 frequency bands (256 Bins) have been taken of speech signal 200. The selection of the number of signal bands is a methodology well known to those of skill in the art and a band length of 256 is used for illustration purposes only, as other band lengths may be used as well. The substantially horizontal line 208 represents the intensity of the background noise in the environment in which speech signal 200 was obtained. In general, speech signal 200 must be detected against this background of environmental noise. Speech signal 200 is easily detected in intensity ranges above the noise 208. However, speech signal 200 must be extracted from the background noise at intensity levels below the noise level. Furthermore, at intensity levels at or near the noise level 208 it can become difficult to distinguish speech from noise 208.

Referring once again to FIGS. 1 and 14, at step 102, a speech signal may be obtained by the speech signal isolation system 100 from an external apparatus, such as a microphone, and so forth. In common practice, the speech signal 200 may contain background noise such as noise from a crowd in a concert environment or noise from an automobile or noise from some other source. As line 208 of FIG. 2 illustrates, background noise masks a portion of the speech signal 200. Speech signal 200 peaks above line 208 at one or more locations, but the portions of the speech signal 200 that fall below resolution line 208 are more difficult or impossible to resolve because of the background noise. In block 104, the speech signal 200 may be fed by the speech signal isolation system 10 through a neural network that is trained to isolate and reconstruct a speech signal in a noisy environment. At step 106, the speech signal 200 isolated from the background noise by the neural network is used to generate an estimated speech signal with the background noise significantly reduced or eliminated.

Figure 3:
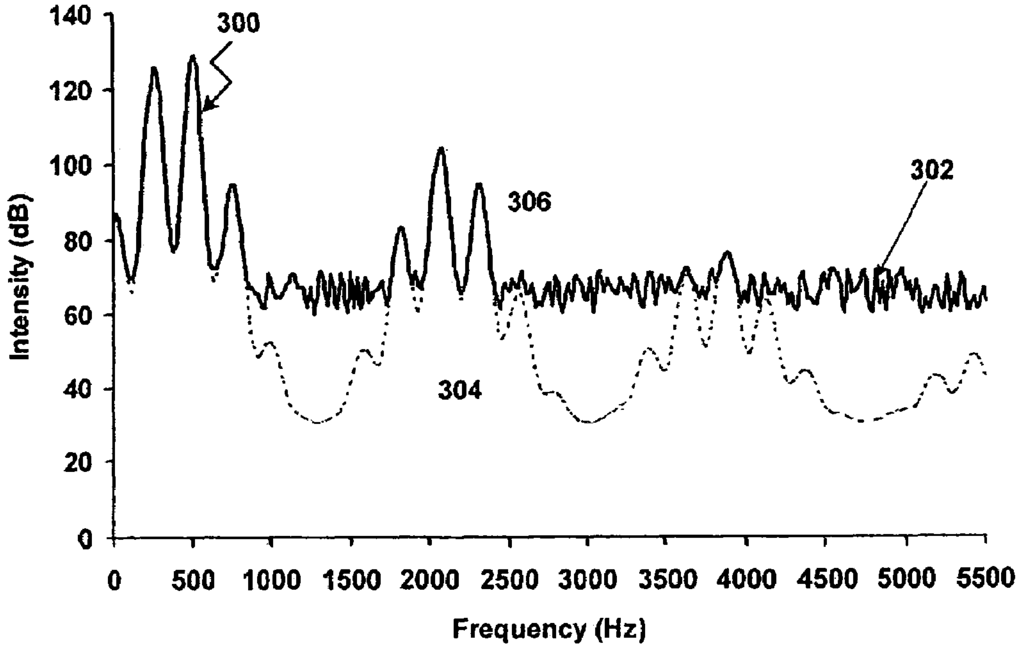
FIG. 3 is a diagram illustrating the frequency spectrum of a typical vowel sound partially masked by noise.

A major problem in speech detection is the isolation of the speech signal 200 from background noise. In a noisy environment, many of the frequency components of the speech signal 200 may be partially or even entirely masked by the frequencies of noise. This phenomenon is clearly illustrated in FIG. 3. Noise 302 interferes with speech signal 300 so that the portion 304 of the speech signal 300 is masked by the noise 302 and only the portion 306 that rises above the noise 302 is readily detectable. Since area 306 contains only a portion of the speech signal 300, some of the speech signal 300 is lost or masked due to the noise.

As referred to herein, a neural network is a computer architecture modeled loosely on the human brain's interconnected system of neurons. Neural networks imitate the brain's ability to distinguish patterns. In use, neural networks extract relationships that underlie data that are input to the network. A neural network may be trained to recognize these relationships much as a child or animal is taught a task. A neural network learns through a trial and error methodology. With each repetition of a lesson, the performance of the neural network improves.

Figure 4:
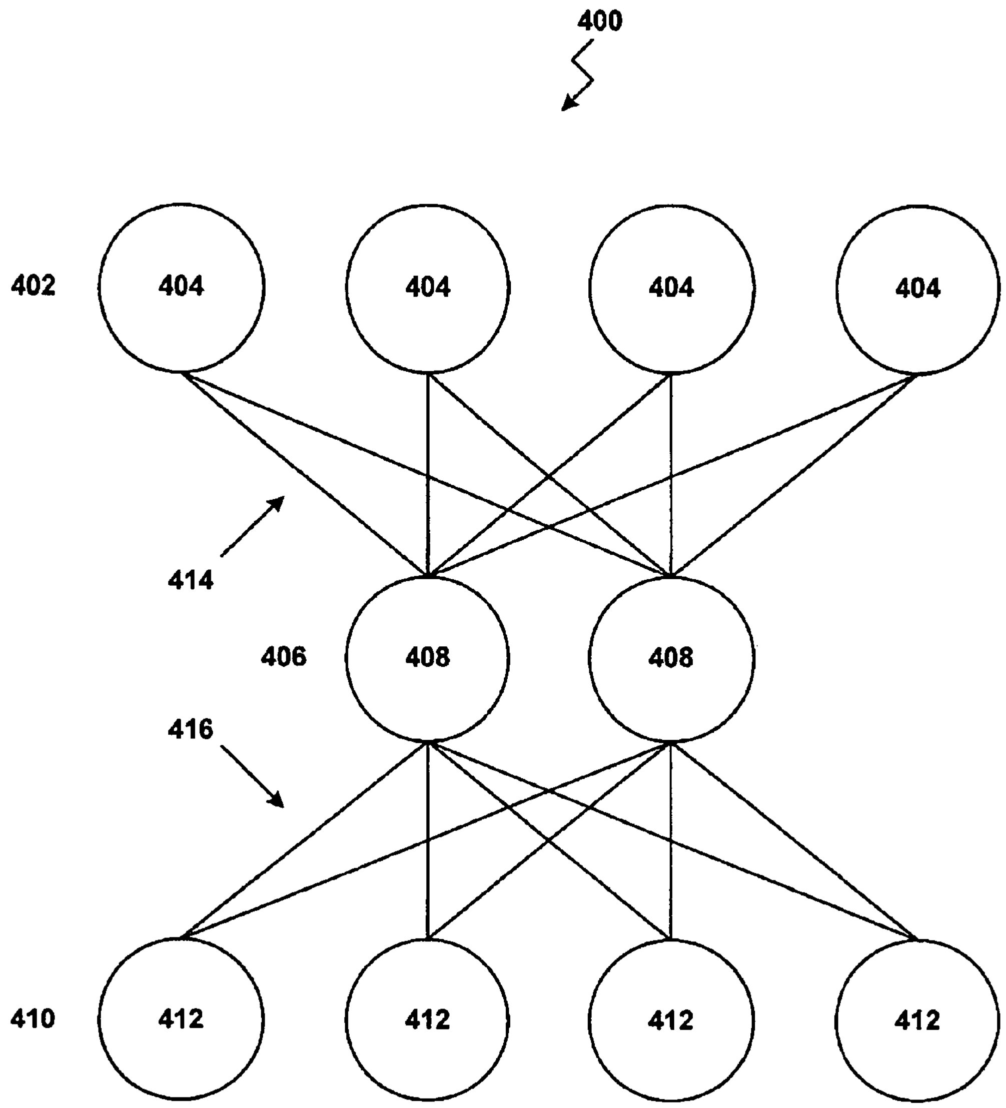
FIG. 4 is a drawing of a neural network.

FIG. 4 illustrates a typical neural network 400 that may be used by the speech signal isolation system 10. Neural network 400 consists of three computational layers. Input layer 402 consists of input neurons 404. Hidden layer 406 consists of hidden neurons 408. Output layer 410 consists of output neurons 412. As illustrated, each neuron 404, 408 and 412 in each layer 402, 406 and 410 may be fully interconnected with each neuron 404, 408 and 412 in the succeeding layer 402, 406 and 410. Thus, each of the input neurons 404 may be connected to each of the hidden neurons 408 via connection 414. Further, each of the hidden neurons 408 may be connected to each of the output neurons 412 via connection 416. Each of the connections 414 and 416 is associated with a weight factor.

Each neuron may have an activation within a range of values. This range may be for example, from 0 to 1. The input to input neurons 404 may be determined by the application, or set by the network's environment. An input to the hidden neurons 408 may be the state of the input neurons 404 multiplied or adjusted by the weight factors of connections 414. An input to the output neurons 412 may be the state of input neurons 408 multiplied or adjusted by the weight factors of connections 416. The activation of a respective hidden or output neuron 412 may be the result of applying a "squashing or sigmoid" function to the sum of the inputs to that node. The squashing function may be a nonlinear function that limits the input sum to a value within a range. Again, the range may be from 0 to 1.

The neural network "learns" when examples (with known results) are presented to it. The weighting factors are adjusted with each repetition to bring the output closer to the correct result. After training, in practice, the state of each input neuron 404 is assigned by the application or set by the network's environment. The input of the input neurons 404 may be propagated to each hidden neuron 408 through weighted connections 414. The resultant state of hidden neurons 408 may then be propagated to each output neuron 412. The resultant state of each output neuron 412 is the network's solution to the pattern presented to input layer 402.

Figure 5:
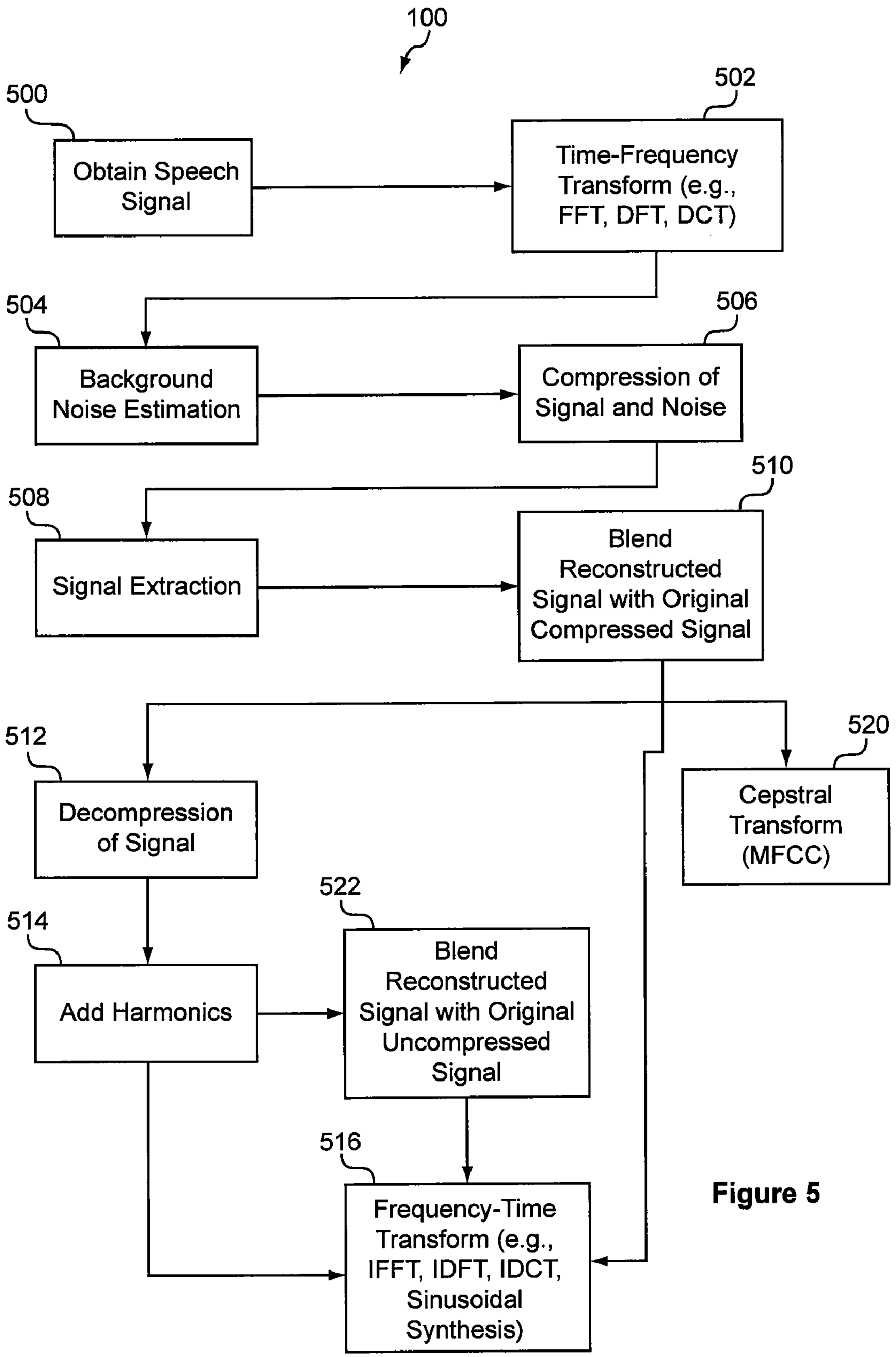
FIG. 5 is a block diagram illustrating the speech signal processing methodology of the speech signal isolation system.

FIG. 5 is a block diagram further illustrating the speech signal processing performed by the speech signal isolation system 10. At step 500, a speech signal is obtained from an external speech signal apparatus, such as a microphone. The speech signal may be sampled in a time series of approximately 46 milliseconds (ms), but other time series may be used as well. Those skilled in the art should recognize that the speech signal may be obtained from several different types of sources. For example, a speech signal may be obtained from an audio recording that someone desires to clean-up by removing the background noise, or from one or more microphones inside a noisy automobile.

At step 502, a transform from the time domain to the frequency domain is performed. This transform may be a Fast Fourier Transform (FFT), but may also be a DFT, DCT, filter bank, or any other method that estimates the power of a speech signal across frequencies. The FFT is a technique for expressing a waveform as a weighted sum of sines and cosines. The FFT is an algorithm for computing the Fourier Transform of a set of discrete data values. Given a finite set of data points, for example a periodic sampling taken from a voice signal, the FFT may express the data in terms of its component frequencies. As set forth below, it may also solve the essentially identical inverse problem of reconstructing a time domain signal from the frequency data.

As further illustrated, at step 504 background noise contained in the speech signal is estimated. The background noise may be estimated by any known means. An average may be computed, for example, from periods of silence, or where no speech is detected. The average may be continuously adjusted depending on the ratio of the signal at each frequency to the estimate of the noise, where the average is updated more quickly in frequencies with low ratios of signal to noise. Or a neural network itself may be used to estimate the noise.

The speech signal generated at step 502 and the noise estimate generated at 504 are then compressed at step 506. In one example, a "Mel frequency scale" algorithm may be used to compress the speech signal. Speech tends to have greater structure in the lower frequencies than at higher, so a nonlinear compression tends to evenly distribute frequency information across the compressed bins.

Information in speech attenuates in a logarithmic fashion. At the higher frequencies, only "S" or "T" sounds are found; so very little information needs to be maintained. The Mel frequency scale optimizes compression to preserve vocal information: linear at lower frequencies; logarithmic at higher frequencies. The Mel frequency scale may be related to the actual frequency (f) by the following equation:

$$\mathrm{mel}(f)=2595\log(1+f/700)$$

where f is measured in Hertz (Hz). The resultant values of the signal compression may then be stored in a "Mel frequency bank." The Mel frequency bank is a filter bank created by setting the center frequencies to equally spaced Mel values. The result of this compression is a smooth signal highlighting the informational content of the voice signal, as well as a compressed noise signal.

The Mel scale represents the psychoacoustic ratio scale of pitch. Other compression scales may also be used, such as log base 2 frequency scaling, or the Bark or ERB (Equivalent Rectangular Bandwidth) scale. These latter two are empirical scales based on the psychoacoustic phenomenon of Critical Bands.

Prior to compression, the speech signal from 502 may also be smoothed. This smoothing may reduce the impact of the variability from high pitch harmonics on the smoothness of the compressed signal. Smoothing may be accomplished by using LPC, or spectral averaging, or interpolation.

At step 508, the speech signal is extracted from the background noise by assigning the compressed signal as input to the neural network component 18 of the signal processing unit 16. The extracted signal represents an estimate of the original speech signal in the absence of any background noise. At step 510 the extracted signal created by step 508 is blended with the compressed signal created at step 506. The blending process preserves as much of the original compressed speech signal (from step 506) as possible, while relying on the extracted speech estimate only as needed. Referring back to FIG. 3, portions of the original speech signal such as 306, which are significantly above the level of background noise 302 are readily detectable. Thus, these portions of the speech signal may be retained in the blended signal in order to retain as many of the original characteristics of the speech signal as possible. In the portions of the original signal where the signal is entirely masked by the background noise there is no choice but to rely on the speech signal estimate extracted by the neural network at step 508, provided that the extracted signal does not exceed the background noise or the original signal intensity. In the areas where the signal intensity is at or near the same level of the background noise the compressed original signal and the signal extracted at step 508 may be combined in order to achieve as close an estimate of the original signal as possible. The blending process results in a compressed reconstructed speech signal with as many characteristics of the original pristine speech signal as possible but with significantly reduced background noise.

The remaining blocks outline the steps that can be performed on the compressed reconstructed speech signal. The steps performed on time reconstructed speech signal will vary depend on the application in which the speech signal is used. For example, the reconstructed speech signal may be directly converted into a form compatible with an automatic speech recognition system. Step 520 shows a Mel Frequency Cepstral Coefficient (MFCC) transform. The output of step 520 may be input directly into a speech recognition system. Alternatively, the compressed reconstructed speech signal generated in step 510 may be transformed directly back into a time series or audible speech signal by performing an inverse frequency domain—time-series transform on the compressed reconstructed signal at step 516. This results in a time series signal having significantly reduced or completely eliminated background noise. In yet another alternative, the compressed reconstructed speech signal may be decompressed at step 512. Harmonics may be added back into the signal at step 514 and the signal may be blended again. This time with the original uncompressed speech signal and the blended signal transformed back into a time-series speech signal or the signal may be transformed back into a time-series signal immediately after the harmonics are added, without additional blending. In either case the result is an improved time series speech signal having most if not all background noise removed.

The speech signal whether it be the output from the first blending step 510, the second blending step 522, or after additional harmonics are added at step 514, may be transformed back into the time domain at 516 using the inverse of the time-to-frequency transform used at 502.

Figure 6:
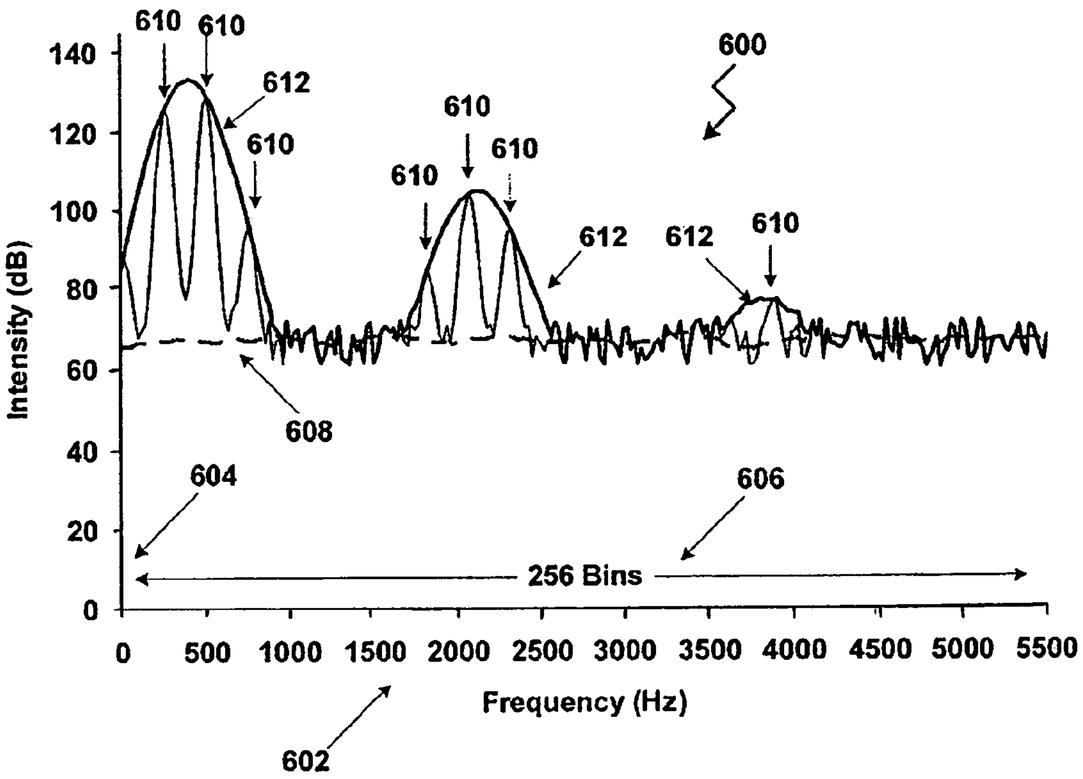
FIG. 6 is an illustration of a typical vowel sound partially masked by noise and its smoothed envelop.

FIG. 6 illustrates the first stage of the speech signal compression process represented at step 506 in FIG. 5. Speech signal 600 is characterized both by its constituent frequencies and the intensity of each frequency band. Speech signal 600 is plotted against frequency (Hz) axis 602 and intensity (dB) axis 604. The frequency plot is generally comprised of an arbitrary number of discrete bands. Frequency bank 606 indicates that 256 frequency bands comprise speech signal 600. The selection of the number of signal bands is a methodology well known to those of skill in the art, and a band length of 256 is used for illustration purposes only. Resolution line 608 represents the intensity of background noise.

Speech signal 600 contains many frequency spikes 610. These frequency spikes 610 may be caused by harmonics within speech signal 600. The existence of these frequency spikes 610 masks the true speech signal and complicates the speech isolation process. These frequency spikes 610 may be eliminated by a smoothing process. The smoothing process may consist of interpolating a signal between the harmonics in the speech signal 600. In those areas of speech signal 600 where harmonic information is sparse, an interpolating algorithm averages the interpolated value over the remaining signal. Interpolated signal 612 is the result of this smoothing process.

Figure 7:
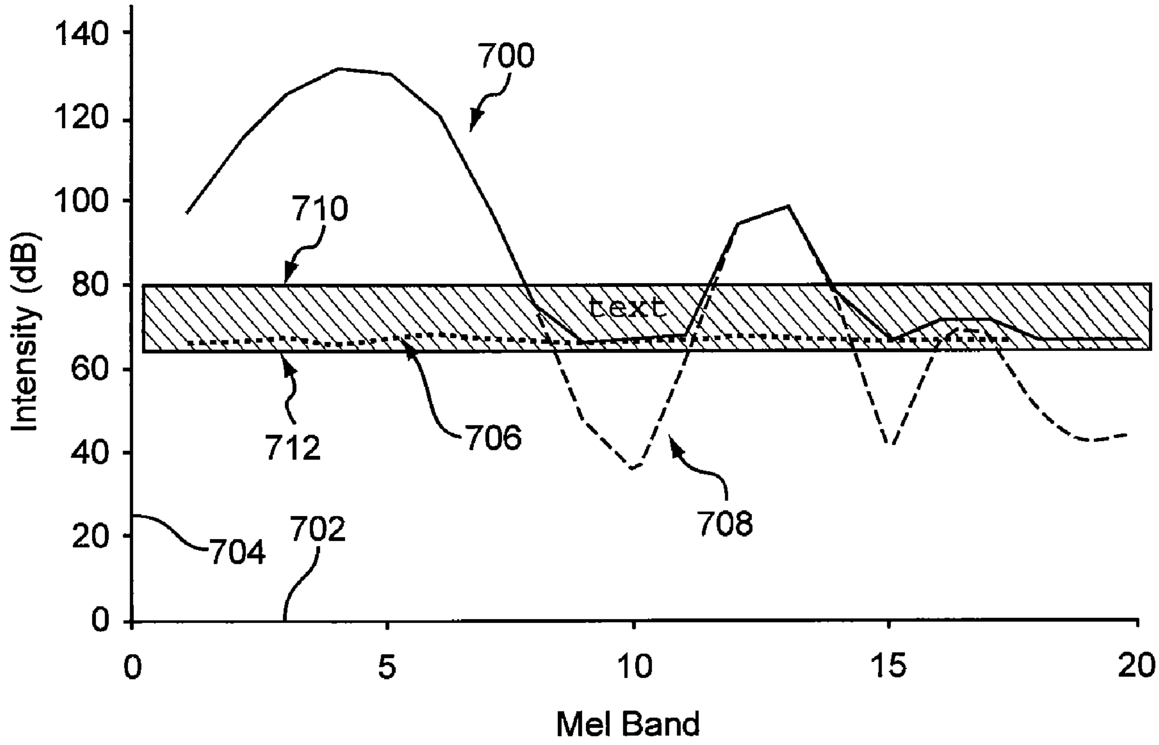
FIG. 7 is a diagram illustrating a compressed speech signal.

FIG. 7 is a diagram illustrating a compressed speech signal 700. Compressed speech signal 700 is plotted against a Mel band axis 702 and intensity (dB) axis 704. Compressed noise estimate 706 is also shown. The result of the signal compression is a signal represented by a smaller number of bands, which in this example may be between 20 and 36 bands. The bands representing the lower frequencies generally represent four to five bands of the uncompressed signal. The bands in the median frequencies represent approximately 20 pre-compression bands. Those at higher frequencies generally represent approximately 100 prior bands.

FIG. 7 also illustrates the expected result of step 508. The compressed noisy speech signal 700 (solid line) is input to the neural network component 18 of the signal processing unit 15 (FIG. 14). The output from the neural network is compressed speech signal 708 (dashed line). Signal 708 represents the ideal case where all of the impact of noise on the speech signal has been negated or nullified. Compressed speech signal 708 is said to be the reconstructed speech signal.

FIG. 7 also shows intensity threshold values employed in the blending processing of step 510. An upper intensity threshold value 710 defines an intensity level substantially above the intensity of the background noise. Components of the original speech signal above this threshold can be readily detected without removal of the background noise. Accordingly for portions of the original speech signal having intensity levels above the upper intensity threshold 710 the blending processes uses only the original signal. A lower intensity threshold value 712 defines an intensity level just below the average intensity of the background noise. Components of the original signal that have intensity levels below the lower intensity threshold value 712 are indistinguishable from the background noise. Therefore, for portions of the original speech signal having intensity levels below the lower intensity threshold value 712, the blending process uses only the reconstructed speech signal generated from step 508, provided that the extracted signal does not exceed the background noise or the original signal intensity. For portions of the original speech signal having intensity levels in the range between the lower intensity threshold valve 712 and the upper intensity threshold value 710, the original speech signal includes content that is still valuable in the terms of providing information that contributes to the intelligibility and quality of the speech signal, but it is less reliable because it is closer to the average value of the background noise and may in fact include components of noise. Therefore, for portions of the original signal that have intensity values in the range between the upper intensity threshold value 710 and the lower intensity threshold value 712, the blending process at step 510 uses components of both the original speech compressed signal and the reconstructed compressed signal from step 508. For portions of the reconstructed signal having intensity values between the upper and lower intensity threshold values, the blending process in step 510 uses a sliding scale approach. Information from the original signal nearer the upper intensity threshold value is further from the noise threshold and thus more reliable than information nearer the lower intensity threshold value 712. To account for this, the blending process gives greater weight to the original speech signal when the signal intensity is closer to the upper intensity threshold value and less weight to the original signal when the signal intensity is closer to the lower intensity threshold value 712. In a reciprocal manner, the blending process gives more weight to the compressed reconstructed signal from step 508 for those portions of the original signal having intensity levels closer to the lower intensity threshold value 712, and less value to the compressed reconstructed signal for portions of the original signal having intensity levels approaching the upper intensity threshold value 710.

Figure 8:
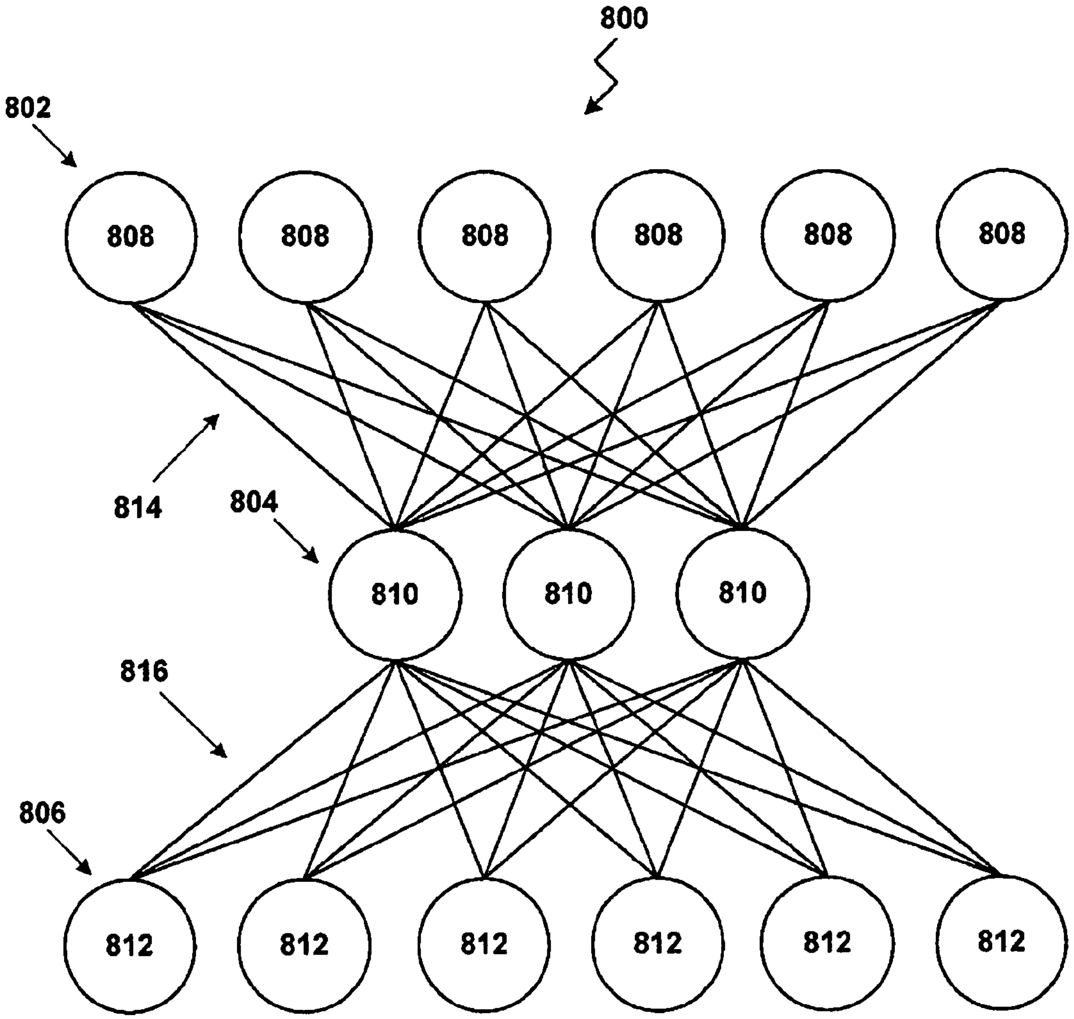
FIG. 8 is diagram of an illustrative neural network architecture used by the speech signal isolation system.

FIG. 8 is a diagram representing another exemplary speech isolation neural network. Neural network 800 is comprised of three processing layers: Input layer 802, hidden layer 804, and output layer 806. Input layer 802 may be comprised of input neurons 808. Hidden layer 804 may be comprised of hidden neurons 810. Output layer 806 may be comprised of output neurons 812. Each input neuron 808 in input layer 802 may be fully interconnected to each hidden neuron 810 in hidden layer 804 via one or more connections 814. Each hidden neuron 810 in hidden layer 804 may be fully interconnected to each output unit 812 in output layer 806 via one or more connections 816.

Although not specifically illustrated, the number of input neurons 808 in input layer 802 may correspond to the number of bands in frequency bank 702. The number of output neurons 812 may also equal the number of bands in frequency bank 702. The number of hidden neurons 810 in hidden layer

804 may be a number between 10 and 80. The state of input neurons 808 is determined by the intensity values in frequency bank 702. In practice, neural network 800 takes a noisy speech signal such as 700 as input and produces a clean speech signal such as 708 as output.

Figure 9:
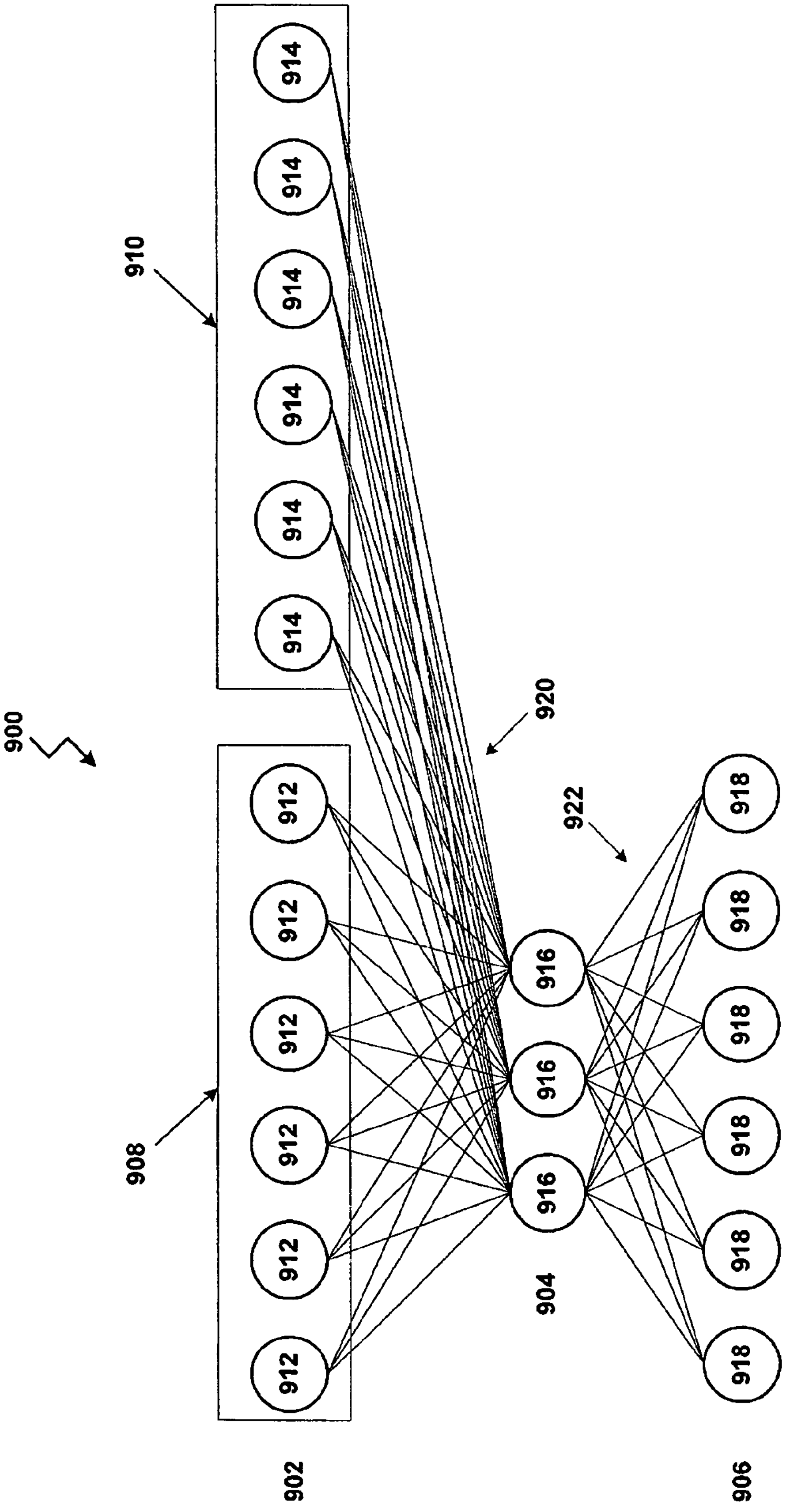
FIG. 9 is a diagram of another illustrative neural network architecture in accord with the present invention.

FIG. 9 is a diagram representing another exemplary speech isolation neural network 900. Neural network 900 is comprised of three processing layers: input layer 902, hidden layer 904, and output layer 906. Input layer 902 is comprised of two sets of input neurons, speech signal input layer 908 and mask input layer 910. Speech signal input layer 908 is comprised of input neurons 912. Mask input layer 910 is comprised of input neurons 914. Hidden layer 904 is comprised of hidden neurons 916. Output layer 906 may be comprised of output neurons 918. Each input neuron 912 in speech signal input layer 908 and each input neuron 914 in noise signal input layer 910 may be fully interconnected to each hidden neuron 916 in hidden layer 904 via one or more connections 920. Each hidden neuron 916 in hidden layer 904 may be fully interconnected to each output neuron 918 in output layer 906 via one or more connections 922.

The number of neurons 912 in speech signal input layer 908 may correspond to the number of bands in frequency bank 702. Similarly, the number of neurons 914 in mask signal input layer 910 may correspond to the number of bands in frequency bank 702. The number of output neurons 918 may also be equal to the number of bands in frequency bank 702. The number of hidden neurons 916 in hidden layer 904 may be a number between 10 and 80. The state of input neurons 912 and input neurons 914 are determined by the intensity values in frequency bank 702.

In practice, neural network 900 takes a noisy speech signal such as 700 as an input and produces a noise reduced speech signal such as 708 as an output. Mask input layer 910 either directly or indirectly provides information about the quality of the speech signal from 506, or as represented by 700. That is, in one example of the invention, mask input layer 910 takes as input compressed noise estimate 706.

In another example of the invention, a binary mask may be computed from a comparison of the noise estimate 706 and the compressed noisy signal 700. At each compressed frequency band of 702, the mask may be set to 1 when the intensity difference between 700 and 706 exceeds a threshold, such as 3 dB, else it is set to 0. The mask may represent an indication of whether the frequency band carries reliable or useful information to indicate speech. The function of 506 may be to reconstruct only those portions of 700 that are indicated by the mask to be 0, or masked by noise 706.

In yet another example of the invention, the mask is not binary, but the difference between 700 and 706. Thus, this “fuzzy” mask indicates to the neural network a confidence of reliability. Areas where 700 meets 706 will be set to 0, as in the binary mask, areas where 700 is very close to 706 will have some small value, indicating low reliability or confidence, and areas where 700 greatly exceeds 706 will indicate good speech signal quality.

Neural networks may learn associations in time as well as across frequency. This may be important for speech because the physical mechanics of the mouth, larynx, vocal tract impose limits on how fast one sound can be made after another. Thus, sounds from one time frame to the next tend to be correlated, and a neural network that can learn these correlations may outperform one that does not.

Figure 10:
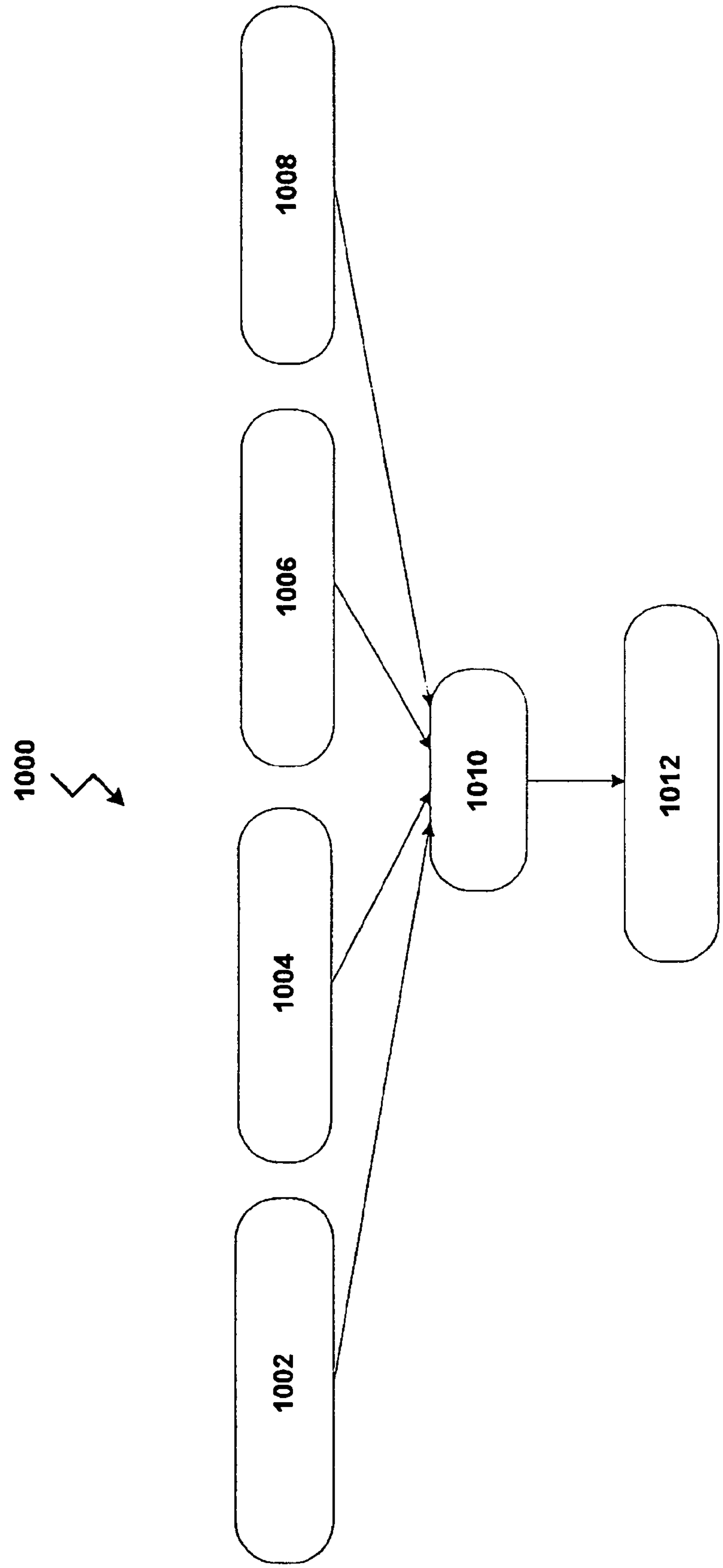
FIG. 10 is a diagram of another illustrative neural network architecture.

FIG. 10 is a diagram representing another exemplary speech isolation neural network 1000. Individual neurons are not indicated here for simplification. Neural network 1000 is comprised of three processing layers: input layer 1002-1008, hidden layer 1010, and output layer 1012. Network 1000 may be identical to 900, except the activation values of neurons in input layers 1002 to 1006 may be assigned values from compressed speech signals at previous time steps. For example, at time t, 1002 is assigned compressed noisy signal 700 at t-2, 1004 is assigned to 700 at t-1, 1006 is assigned to 700 at time t, and 1008 may be assigned the mask, as described above. Thus, 1010 can learn temporal associations between compressed speech signals.

Figure 11:
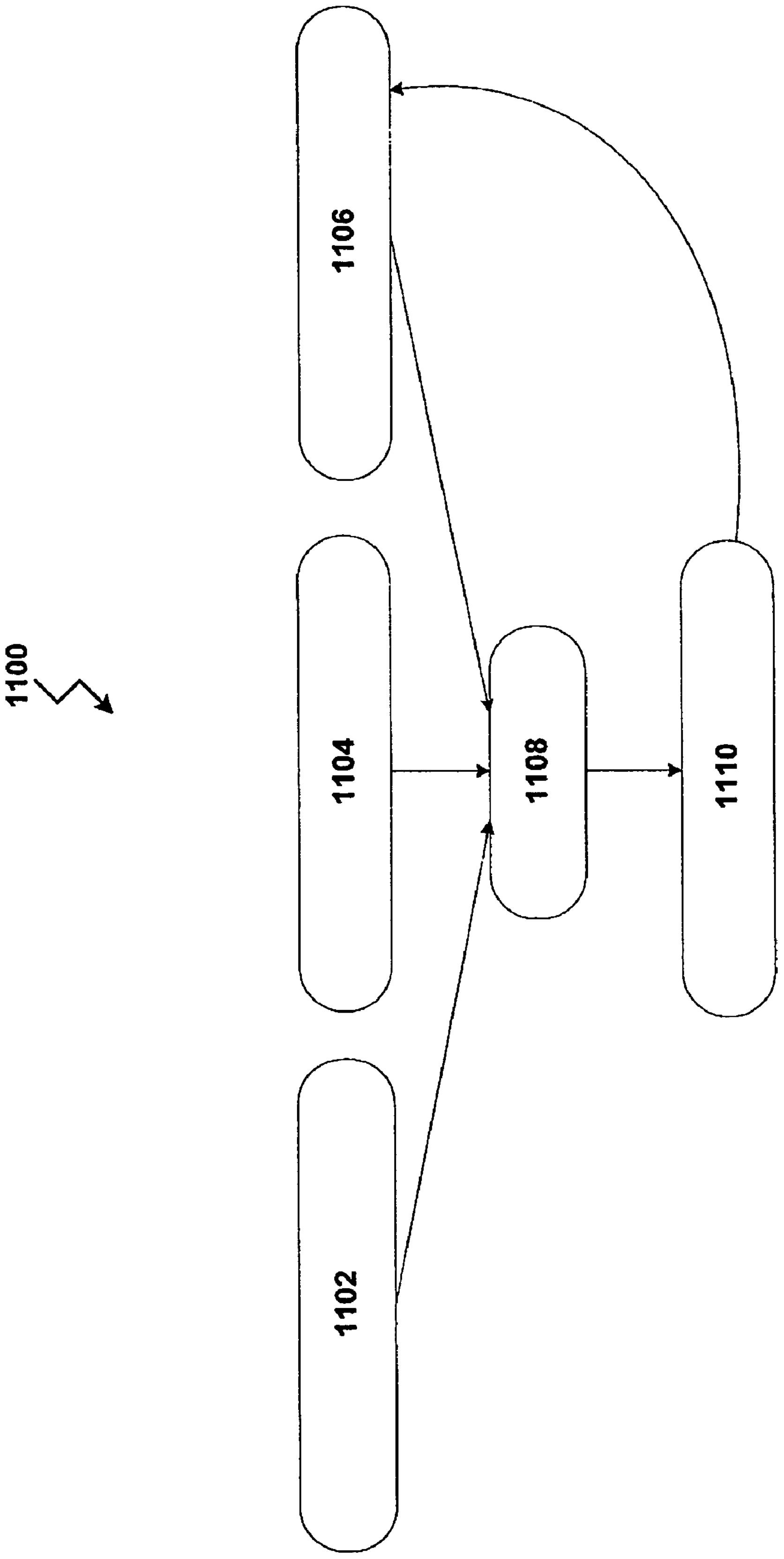
FIG. 11 is a diagram of another illustrative neural network architecture that incorporates feedback.

FIG. 11 is a diagram representing another exemplary speech isolation neural network 1100. Neural network 1100 is comprised of three processing layers: input layer 1102-1106, hidden layer 1108, and output layer 1110. Network 1100 may be identical to 900, except the activation values of neurons in input layer 1106 may be assigned values from the extracted speech signal from 1110 at the previous time step. For example, at time t, 1102 is assigned compressed noisy signal 700 at t-1, 1104 is assigned to the mask, and 1106 is assigned to the state of 1110 at time t-1. This network is well known in the literature as a Jordan network, and can learn to change its output depending on current input and previous output.

Figure 12:
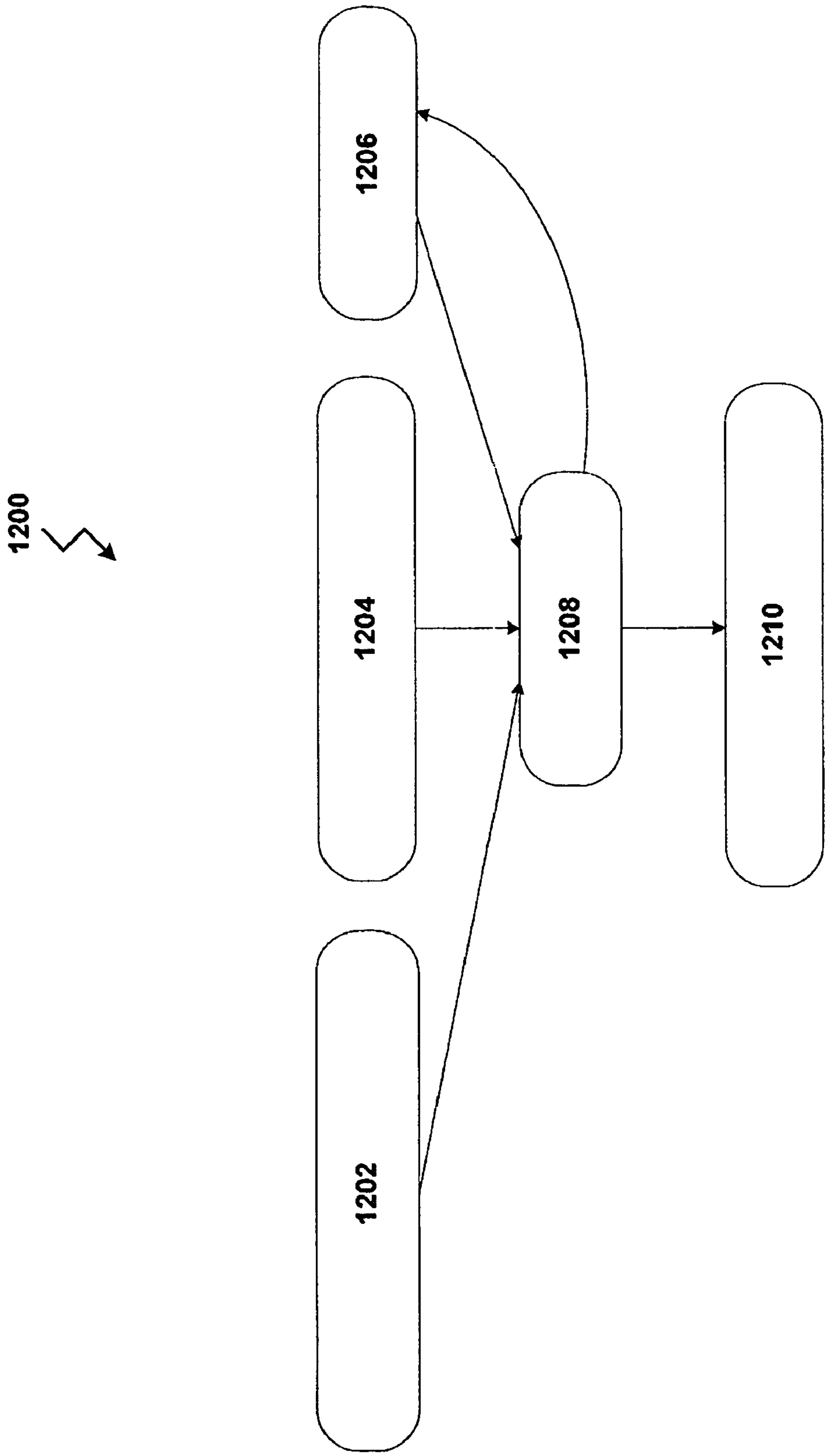
FIG. 12 is a diagram of another illustrative neural network architecture that incorporates feedback.

FIG. 12 is a diagram representing another exemplary speech isolation neural network 1200. Neural network 1200 is comprised of three processing layers: input layer 1202-1206, hidden layer 1208, and output layer 1210. Network 1200 may be identical to 1100, except the activation values of neurons in input layer 1206 may be assigned values from 1208 at the previous time step. For example, at time t, 1202 is assigned compressed noisy signal 700 at t-1, 1204 is assigned to the mask, and 1206 is assigned to the state of 1206 at time t-1. This network is well known in the literature as an Elman network, and can learn to change its output depending on current input and previous internal or hidden activity.

Figure 13:
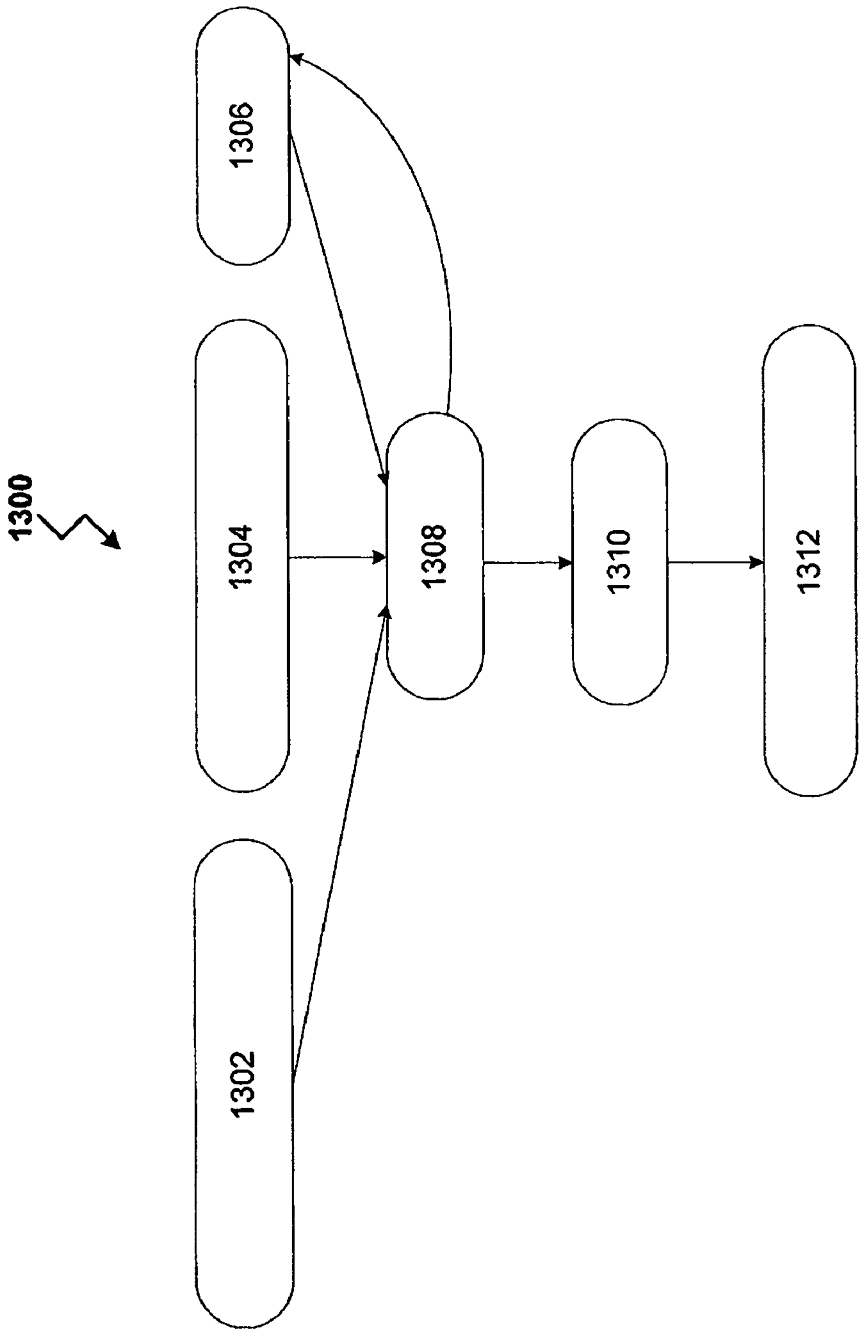
FIG. 13 is a diagram of another illustrative neural network architecture that incorporates feedback and an additional hidden layer.

FIG. 13 is a diagram representing another exemplary speech isolation neural networks 1300. Neural network 1300 is identical to 1200, except that it contains another hidden unit layer 1310. This extra layer may allow the learning of higher order associations that would better extract speech.

The intensity value of an hidden or output unit may be determined by the sum of the products of the intensity of each input neuron to which it is connected and the weight of the connection between them. A nonlinear function is used to reduce the range of the activation of a hidden or output neuron, This nonlinear function may be any of a sigmoidal function, logistic or hyperbolic function, or a line with absolute limits. These functions are well known to those of ordinary skill in the art.

The neural networks may be trained on a clean multi-participant speech signal in which real or simulated noise has been added.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A speech signal isolation system for extracting a speech signal from background noise in an audio signal comprising:

a background noise estimation component adapted to estimate background noise intensity of an audio signal across a plurality of frequencies;

a neural network component adapted to extract a speech estimate signal from the background noise; and a blending component for generating a reconstructed speech signal from the audio signal and the extracted speech, wherein the reconstructed speech signal comprises portions of the speech signal where an intensity of the speech signal is above the estimated background intensity level, portions of the extracted speech estimate signal where the intensity of the speech signal is below the estimated background intensity level, and a combination of the speech signal and the extracted speech estimate signal where the intensity of the speech signal is near the estimated background intensity level.

2. The system of claim 1 further comprising a frequency transform component for transforming said audio signal from a time-series signal to a frequency domain signal.

3. The system of claim 2 further comprising a compression component for generating a compressed audio signal having a reduced number of frequency subbands.

4. The system of claim 3 wherein the neural network has a first set of input nodes equal to the number of frequency subbands in the compressed audio signal, for receiving said compressed audio signal.

5. The system of claim 4 wherein the neural network includes a second set of input nodes equal to the number of frequency subbands, for receiving said background noise estimate.

6. The system of claim 4 wherein the neural network includes a second set of input nodes equal to the number of frequency subbands in the compressed audio signal for receiving the compressed audio signal from a previous time step.

7. The system of claim 4 wherein the neural network includes a second set of input nodes equal to the number of frequency subbands in the compressed audio signal, for receiving the output of the neural network from a previous time step.

8. The system of claim 4 wherein the neural network includes a second set of input nodes, for receiving an intermediate result from a previous time step.

9. A method of isolating a speech signal from an audio signal having a speech component and background noise, and the method comprising:

transforming a time-series audio signal into the frequency domain;

estimating the background noise in the audio signal across multiple frequency bands; extracting a speech signal estimate from the audio signal;

blending a portion of the speech signal estimate with a portion of the audio signal based on the background noise estimate to provide a reconstructed speech signal having reduced background noise, wherein the reconstructed speech signal comprises portions of the speech signal where an intensity of the speech signal is above an upper intensity threshold value which is greater than the estimated background intensity level, portions of the extracted speech estimate signal where the intensity of the speech signal is below a lower intensity threshold value which is near the estimated background intensity level, and a combination of the speech signal and the extracted speech estimate signal where the intensity of the speech signal is between the upper intensity threshold value and the lower intensity threshold value.

10. The method of claim 9 wherein extracting a speech signal estimate from the audio signal comprises assigning the audio signal as input to a neural network.

11. The method of claim 9 wherein combining the portions of the audio signal with portions of the speech signal estimate comprises weighting the audio signal and the speech signal estimate such that the speech signal estimate is given greater weight than the audio signal for portions of the audio signal having intensity values closer to the lower intensity threshold value, and greater weight to the audio signal than the speech signal estimate for those portions of the audio signal having intensity values closer to the upper intensity threshold value.

12. The method of claim 10 further comprising applying the background noise estimate to the neural network.

13. The method of claim 10 further comprising applying the speech signal estimate from a previous time step to the neural network.

14. The method of claim 10 further comprising applying an intermediate result of the speech signal estimate from a previous time step to the neural network.

15. The method of claim 10 further comprising applying the audio signal from a previous time step to the neural network.

16. A system for enhancing a speech signal comprising:

an audio signal source providing an audio time-series signal having both speech content and background noise;

a signal processor providing a frequency transform function for transforming the audio signal from the time-series domain to the frequency domain;

a background noise estimator;

a neural network; and a signal combiner said background noise estimator forming an estimate of the background noise in said audio signal, and said neural network extracting the speech signal estimate from said audio signal, and said signal combiner combining the speech signal estimate and the audio signal based on the background noise, estimate to produce a reconstituted speech signal having substantially reduced background noise, wherein the reconstructed speech signal comprises portions of the speech signal where an intensity of the speech signal is above the estimated background intensity level, portions of the extracted speech estimate signal where the intensity of the speech signal is below the estimated background intensity level, and a combination of the speech signal and that extracted speech estimate signal where the intensity of the speech signal is near the estimated background intensity level.

17. The system of claim 16 wherein the neural network comprises a first set of input nodes for receiving the audio signal.

18. The system of claim 17 wherein the neural network comprises a second set of input nodes for receiving the audio signal from a previous time step.

19. The system of claim 17 wherein the neural network comprises a second set of input nodes for receiving the background noise estimate.

20. The system of claim 17 wherein the neural network comprises a second set of input nodes for receiving the speech signal estimate from a previous time step.

21. The system of claim 17 wherein the neural network comprises a second set of input nodes for receiving an intermediate result from a previous time step.

* * * * *

UNITED STATES PATENT AND TRADEMARK OFFICE

CERTIFICATE OF CORRECTION

PATENT NO. : 7,620,546 B2
APPLICATION NO. : 11/085825
DATED : November 17, 2009
INVENTOR(S) : Hetherington et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1140 days.

Signed and Sealed this

Twenty-sixth Day of October, 2010

David J. Kappos

*Director of the United States Patent and Trademark Office*

UNITED STATES PATENT AND TRADEMARK OFFICE

CERTIFICATE OF CORRECTION

PATENT NO. : 7,620,546 B2
APPLICATION NO. : 11/085825
DATED : November 17, 2009
INVENTOR(S) : Phillip Hetherington et al.

It is certified that error appears in the above-identified patent and that said Letters Patent is hereby corrected as shown below:

In the Claims

In column 12, claim 16, line 43, after “of the speech signal and” replace “that” with --the--.

Signed and Sealed this
Twentieth Day of December, 2011

David J. Kappos
*Director of the United States Patent and Trademark Office*